US012665649B2

(12) United States Patent
Ling et al.

(10) Patent No.: US 12,665,649 B2
(45) Date of Patent: Jun. 23, 2026

(54) METHOD AND APPARATUS FOR BEAM FAILURE RECOVERY IN MULTI-DCI BASED MULTIPLE TRPS

(71) Applicant: LENOVO (BEIJING) LIMITED, Beijing (CN)

(72) Inventors: Wei Ling, Beijing (CN); Chenxi Zhu, Beijing (CN); Bingchao Liu, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 392 days.

(21) Appl. No.: 18/029,344

(22) PCT Filed: Sep. 30, 2020

(86) PCT No.: PCT/CN2020/119502
§ 371 (c)(1),
(2) Date: Mar. 29, 2023

(87) PCT Pub. No.: WO2022/067706
PCT Pub. Date: Apr. 7, 2022

(65) Prior Publication Data
US 2023/0412240 A1 Dec. 21, 2023

(51) Int. Cl.
*H04B 7/06* (2006.01)
*H04L 5/00* (2006.01)
*H04W 74/00* (2009.01)

(52) U.S. Cl.
CPC ....... *H04B 7/06964* (2023.05); *H04B 7/0626* (2013.01); *H04W 74/004* (2013.01)

(58) Field of Classification Search
CPC ............. H04B 7/06964; H04B 7/0626; H04W 74/004; H04L 5/005; H04L 5/0053; H04L 5/0023
See application file for complete search history.

(56) References Cited

U.S. PATENT DOCUMENTS 11,546,106 B2 1/2023 Yang
2018/0302889 A1* 10/2018 Guo ..................... H04B 7/0617
(Continued)

FOREIGN PATENT DOCUMENTS

CN 110062397 A 7/2019
CN 110896546 A 3/2020
(Continued)

OTHER PUBLICATIONS

International Searching Authority, "Written Opinion of the International Searching Authority," PCT/CN2020/119502, Jun. 21, 2021, pp. 1-3.

(Continued)

*Primary Examiner* — Harry H Kim
(74) *Attorney, Agent, or Firm* — Kunzler Needham & Hilton

(57) ABSTRACT

Embodiments of the present disclosure are directed to a method and apparatus for beam failure recovery in multi-downlink control information (DCI) based multiple transmit-receive points (TRPs). A method according to an embodiment of the present application may include: receiving a configuration including a plurality of sets of failure detection beams and a plurality of sets of candidate beams, each set of failure detection beams and each set of candidate beams are associated with one of a plurality of CORESET-PoolIndex values; and transmitting a beam failure recovery request in an uplink transmission when all beams in a set of failure detection beams in the plurality of sets of failure detection beams associated with a first CORESETPoolIndex value of the plurality of CORESETPoolIndex values are failed in a slot.

14 Claims, 8 Drawing Sheets

100

(56) References Cited

U.S. PATENT DOCUMENTS

| | | | |
|---|---|---|---|
| 2019/0230545 A1 | 7/2019 | Liou et al. | |
| 2019/0379506 A1 | 12/2019 | Cheng | |
| 2021/0282168 A1 | 9/2021 | Matsumura et al. | |
| 2022/0103234 A1* | 3/2022 | Zhou | H04W 72/046 |
| 2022/0104037 A1* | 3/2022 | Zhou | H04B 7/06964 |
| 2023/0095844 A1* | 3/2023 | Yang | H04L 5/0051 |
| | | | 370/242 |
| 2023/0209634 A1* | 6/2023 | Koskela | H04W 36/305 |
| | | | 370/217 |
| 2023/0412240 A1* | 12/2023 | Ling | H04L 5/005 |

FOREIGN PATENT DOCUMENTS

| | | | |
|---|---|---|---|
| CN | 110972171 A | 4/2020 | |
| WO | 2019184690 A1 | 10/2019 | |
| WO | 2020012619 A1 | 1/2020 | |

OTHER PUBLICATIONS

Nokia, Nokia Shanghai Bell, Enhancements on Beam Management for Multi-TRP/Panel Transmission, 3GPP TSG RAN WG1 #102-e, R1-2006846, Aug. 17-28, 2020, pp. 1-8, e-Meeting.
ITRI, Discussion on beam management for Multi-TRP, 3GPP TSG RAN WG1 #102-e, R1-2006654, Aug. 17-28, 2020, pp. 1-2, e-Meeting.

* cited by examiner

100

METHOD AND APPARATUS FOR BEAM FAILURE RECOVERY IN MULTI-DCI BASED MULTIPLE TRPS

TECHNICAL FIELD

Embodiments of the present disclosure generally relate to wireless communication technology, especially to a method and apparatus for beam failure recovery in multi-downlink control information (DCI) based multiple transmit-receive points (TRPs).

BACKGROUND

There is a work item description (WID) approved on multiple-input multiple-output (MIMO) in New Radio (NR) Release 17 (R17) which includes a research topic, that is, evaluating and, if needed, specifying beam-management-related enhancements for simultaneous multi-TRP transmission with multi-panel reception.

In NR Release 16 (R16) MIMO, multi-DCI based multiple TRPs is supported, and it is mostly worked on the scenario that the latency between multiple TRPs is large. In NR Release 15 (R15) or R16, beam failure recovery can be triggered to recovery the failed link only if all the beams configured as beam failure detection resources are failed. However, in the case of multiple TRPs with non-ideal backhaul, when all the beams configured as beam failure detection resources associated with one TRP are failed, all the transmission associated with this TRP will be blocked since there is no way to recovery it by using the beam failure recovery procedure in NR R15 or NR R16. Therefore, beam failure recovery in multi-DCI based multiple TRPs should be enhanced to improve the robustness of each link between a user equipment (UE) and each TRP.

SUMMARY OF THE APPLICATION

Some embodiments of the present disclosure provide a method. The method may include receiving a configuration including a plurality of sets of failure detection beams and a plurality of sets of candidate beams, wherein each set of failure detection beams and each set of candidate beams are associated with one of a plurality of CORESETPoolIndex values; and transmitting a beam failure recovery request in an uplink transmission when all beams in a set of failure detection beams in the plurality of sets of failure detection beams associated with a CORESETPoolIndex value of the plurality of CORESETPoolIndex values are failed in a slot.

In an embodiment of the present application, a set of failure detection beams associated with the CORESET-PoolIndex value include one of the following: a set of periodic channel state information-reference signal (CSI-RS) resource configuration indexes configured by radio resource control (RRC) signaling; a set of periodic CSI-RS resource configuration indexes with same values as RS indexes in RS sets indicated by TCI-State for control resource sets (CORESETs) associated with the CORESET-PoolIndex value if there is only one RS index in a transmission configuration indicator (TCI) state; and a set of periodic CSI-RS resource configuration indexes with same values as RS indexes with quasi co-location (QCL)-TypeD configuration for the corresponding TCI states if there are two RS indexes in a TCI state of any CORESET associated with the CORESETPoolIndex value.

In an embodiment of the present application, a set of candidate beams associated with the CORESETPoolIndex value include at least one of the following: a set of periodic CSI-RS resource configuration indexes; and a set of synchronization signal (SS)/physical broadcast channel (PBCH) block indexes.

In an embodiment of the present application, the uplink transmission is a transmission by a physical random access channel (PRACH) which is associated with a beam in the set of candidate beams associated with the CORESETPoolIndex value, wherein power of the beam in the set of candidate beams is larger than or equal to a threshold.

In an embodiment of the present application, the method may further include: monitoring a physical downlink control channel (PDCCH) in a recovery search space associated with the CORESETPoolIndex value by using same antenna port quasi-collocation parameters as the ones associated with the beam.

In an embodiment of the present application, the method may further include: after a number of symbols from a last symbol of the PDCCH, monitoring PDCCH in all CORE-SETs associated with the CORESETPoolIndex value by using the same antenna port quasi-collocation parameters as the ones associated with the beam; and transmitting a physical uplink control channel (PUCCH) resource associated with the CORESETPoolIndex value by using the beam and a power determined based on the beam and a closed loop index corresponding to the CORESETPoolIndex value.

In another embodiment of the present application, the CORESETPoolIndex value is a first CORESETPoolIndex value, and the uplink transmission is a transmission by a physical uplink shared channel (PUSCH) associated with a second CORESETPoolIndex value of the plurality of CORESETPoolIndex values carrying a medium access control (MAC) control element (CE) to indicate a beam or no beam from the set of candidate beams associated with the first CORESETPoolIndex value, wherein power of the beam in the set of candidate beams is larger than or equal to a threshold.

In an embodiment of the present disclosure, the method may further include: receiving a downlink control information (DCI) in a PDCCH associated with the second CORE-SETPoolIndex value to schedule a PUSCH transmission with a same hybrid automatic repeat request (HARQ) process number as for the transmission of the PUSCH and having a toggled new data indicator (NDI) field value.

In an embodiment of the present disclosure, the method may further include: after a number of symbols from a last symbol of the PDCCH, monitoring PDCCH in all CORE-SETs associated with the first CORESETPoolIndex value by using the same antenna port quasi-collocation parameters as the ones associated with the beam; and transmitting a PUCCH resource associated with the first CORESET-PoolIndex value by using the beam and a power determined based on the beam and a closed loop index corresponding to the first CORESETPoolIndex value.

In another embodiment of the present disclosure, the plurality of CORESETPoolIndex values are two CORESET-PoolIndex values including CORESETPoolIndex 0 and CORESETPoolIndex 1 and the CORESETPoolIndex value is CORESETPoolIndex 0, and the uplink transmission is a transmission by a PRACH which is associated with a beam in the set of candidate beams associated with CORESET-PoolIndex 0, wherein power of the beam in the set of candidate beams is larger than or equal to a threshold.

In an embodiment of the present disclosure, the method may further include: monitoring a PDCCH in a recovery search space associated with CORESETPoolIndex 0 by using same antenna port quasi-collocation parameters as the ones associated with the beam.

In an embodiment of the present disclosure, the method may further include: after a number of symbols from a last symbol of the PDCCH, monitoring PDCCH in all CORE-SETs associated with CORESETPoolIndex 0 by using the same antenna port quasi-collocation parameters as the ones associated with the beam; and transmitting a PUCCH resource associated with CORESETPoolIndex 0 by using the beam and a power determined based on the beam and a closed loop index corresponding to CORESETPoolIndex 0.

In another embodiment of the present disclosure, the plurality of CORESETPoolIndex values are two CORESET-PoolIndex values including CORESETPoolIndex 0 and CORESETPoolIndex 1 and the CORESETPoolIndex value is CORESETPoolIndex 1, and the uplink transmission is a transmission by a PUSCH associated with CORESET-PoolIndex 0 carrying a MAC CE to indicate a beam or no beam from the set of candidate beams associated with CORESETPoolIndex 1, wherein power of the beam in the set of candidate beams is larger than or equal to a threshold.

In an embodiment of the present disclosure, the method may further include: receiving a DCI in a PDCCH associated with CORESETPoolIndex 0 to schedule a PUSCH transmission with a same hybrid automatic repeat request (HARQ) process number as for the transmission of the PUSCH and having a toggled new data indicator (NDI) field value.

In an embodiment of the present disclosure, the method may further include: after a number of symbols from a last symbol of the PDCCH, monitoring a PDCCH in all CORE-SETs associated with CORESETPoolIndex 1 by using the same antenna port quasi-collocation parameters as the ones associated with the beam; and transmitting an uplink trans-mission by a PUCCH resource associated with CORESET-PoolIndex 1 by using the beam and a power determined based on the beam and a closed loop index corresponding to CORESETPoolIndex 1.

Some other embodiments of the present disclosure pro-vide a method. The method may include: transmitting a configuration including a plurality of sets of failure detection beams and a plurality of sets of candidate beams, wherein each set of failure detection beams and each set of candidate beams are associated with one of a plurality of CORESET-PoolIndex values; and receiving a beam failure recovery request in an uplink transmission when all beams in a set of failure detection beams in the plurality of sets of failure detection beams associated with a CORESETPoolIndex value of the plurality of CORESETPoolIndex values are failed in a slot.

In an embodiment of the present application, a set of failure detection beams associated with the CORESET-PoolIndex value include one of the following: a set of periodic channel state information-reference signal (CSI-RS) resource configuration indexes configured by radio resource control (RRC) signaling; a set of periodic CSI-RS resource configuration indexes with same values as RS indexes in RS sets indicated by TCI-State for control resource sets (CORESETs) associated with the CORESET-PoolIndex value if there is only one RS index in a trans-mission configuration indicator (TCI) state; and a set of periodic CSI-RS resource configuration indexes with same values as RS indexes with quasi co-location (QCL)-TypeD configuration for the corresponding TCI states if there are two RS indexes in a TCI state of any CORESET associated with the CORESETPoolIndex value.

In an embodiment of the present application, a set of candidate beams associated with the CORESETPoolIndex value include at least one of the following: a set of periodic CSI-RS resource configuration indexes; and a set of syn-chronization signal (SS)/physical broadcast channel (PBCH) block indexes.

In an embodiment of the present disclosure, the uplink transmission is a transmission by a PRACH which is asso-ciated with a beam in the set of candidate beams associated with the CORESETPoolIndex value, wherein power of the beam in the set of candidate beams is larger than or equal to a threshold.

In an embodiment of the present disclosure, the method may further include: transmitting a PDCCH in a recovery search space associated with the CORESETPoolIndex value by using same antenna port quasi-collocation parameters as the ones associated with the beam.

In an embodiment of the present disclosure, the method may further include: transmitting a PDCCH in any CORE-SET associated with the CORESETPoolIndex value by using the same antenna port quasi-collocation parameters as the ones associated with the beam; and receiving a physical uplink control channel (PUCCH) resource associated with the CORESETPoolIndex value by using the same antenna port quasi-collocation parameters as the ones associated with the beam, wherein a power of the PUCCH resource is determined based on the beam and a closed loop index corresponding to the CORESETPoolIndex value.

In another embodiment of the present disclosure, the CORESETPoolIndex value is a first CORESETPoolIndex value, and the uplink transmission is a transmission by a PUSCH associated with a second CORESETPoolIndex value of the plurality of CORESETPoolIndex values carry-ing a MAC CE to indicate a beam or no beam from the set of candidate beams associated with the first CORESET-PoolIndex value, wherein power of the beam in the set of candidate beams is larger than or equal to a threshold.

In an embodiment of the present disclosure, the method may further include: transmitting a DCI in a PDCCH associated with the second CORESETPoolIndex value to schedule a PUSCH transmission with a same hybrid auto-matic repeat request (HARQ) process number as for the transmission of the PUSCH and having a toggled new data indicator (NDI) field value.

In an embodiment of the present disclosure, the method may further include: transmitting a PDCCH in any CORE-SET associated with the first CORESETPoolIndex value by using the same antenna port quasi-collocation parameters as the ones associated with the beam; and receiving a PUCCH resource associated with the first CORESETPoolIndex value by using the same antenna port quasi-collocation parameters as the ones associated with the beam, wherein a power of the PUCCH resource is determined based on the beam and a closed loop index corresponding to the first CORESET-PoolIndex value.

In another embodiment of the present disclosure, the plurality of CORESETPoolIndex values are two CORESET-PoolIndex values including CORESETPoolIndex 0 and CORESETPoolIndex 1 and the CORESETPoolIndex value is CORESETPoolIndex 0, and the uplink transmission is a transmission by a PRACH which is associated with a beam in the set of candidate beams associated with CORESET-PoolIndex 0, wherein power of the beam in the set of candidate beams is larger than or equal to a threshold.

In an embodiment of the present disclosure, the method may further include: transmitting a physical downlink con-trol channel (PDCCH) in a recovery search space associated with CORESETPoolIndex 0 by using same antenna port quasi-collocation parameters as the ones associated with the beam.

In an embodiment of the present disclosure, the method may further include: transmitting a PDCCH in any CORE-SET associated with CORESETPoolIndex 0 by using the same antenna port quasi-collocation parameters as the ones associated with the beam; and receiving a PUCCH resource associated with CORESETPoolIndex 0 by using the same antenna port quasi-collocation parameters as the ones associated with the beam, wherein a power of the PUCCH resource is determined based on the beam and a closed loop index corresponding to CORESETPoolIndex 0.

In another embodiment of the present disclosure, the plurality of CORESETPoolIndex values are two CORESET-PoolIndex values including CORESETPoolIndex 0 and CORESETPoolIndex 1 and the CORESETPoolIndex value is CORESETPoolIndex 1, and the uplink transmission is a transmission by a PUSCH associated with CORESET-PoolIndex 0 carrying a MAC CE to indicate a beam or no beam from the set of candidate beams associated with CORESETPoolIndex 1, wherein power of the beam in the set of candidate beams is larger than or equal to a threshold.

In an embodiment of the present disclosure, the method may further include: transmitting a DCI in a PDCCH associated with CORESETPoolIndex 0 to schedule a PUSCH transmission with a same hybrid automatic repeat request (HARQ) process number as for the transmission of the PUSCH and having a toggled new data indicator (NDI) field value.

In an embodiment of the present disclosure, the method may further include: transmitting a PDCCH in any CORE-SET associated with CORESETPoolIndex 1 by using the same antenna port quasi-collocation parameters as the ones associated with the beam; and receiving a PUCCH resource associated with CORESETPoolIndex 1 by using the same antenna port quasi-collocation parameters as the ones associated with the beam, wherein a power of the PUCCH resource is determined based on the beam and a closed loop index corresponding to CORESETPoolIndex 1.

Some other embodiments of the present disclosure provide an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above methods with the at least one receiver, the at least one transmitter and the at least one processor.

According to the embodiments of the present disclosure, the beam failure recovery in multi-DCI based multiple TRPs can be enhanced to improve the robustness of each link between a UE and each TRP.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings.

A wireless communication system generally includes one or more base stations (BSs) and one or more UEs. Furthermore, a BS may be configured with one TRP (or panel) or more TRPs (or panels). A TRP can act like a small BS. The TRPs can communicate with each other by a backhaul link. Such backhaul link may be an ideal backhaul link or a non-ideal backhaul link. In a wireless communication system, one single TRP can be used to serve one or more UEs under control of a BS. In different scenario, TRP may be called in different terms. Persons skilled in the art should understand that as the 3rd Generation Partnership Project (3GPP) and the communication technology develop, the terminologies recited in the specification may change, which should not affect the scope of the present disclosure. It should be understood that the TRP(s) (or panel(s)) configured for the BS may be transparent to a UE.

Figure 1:
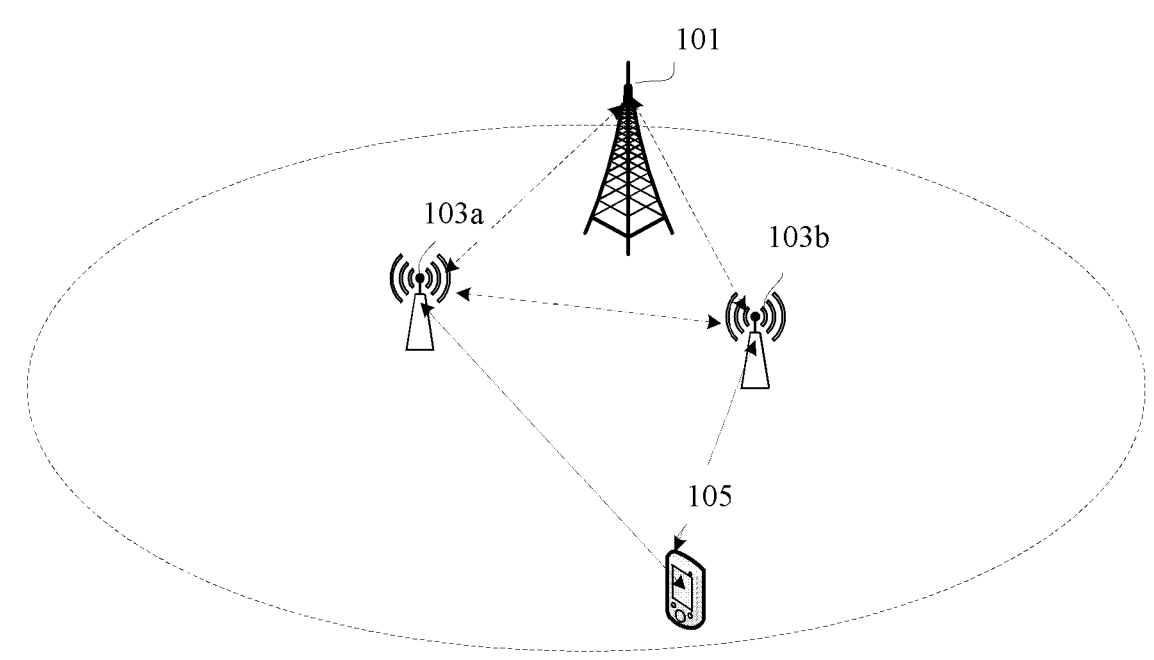
FIG. 1 is a schematic diagram illustrating an exemplary wireless communication system according to some embodiments of the present disclosure.

FIG. 1 is a schematic diagram illustrating an exemplary wireless communication system according to some embodiments of the present disclosure.

Referring to FIG. 1, a wireless communication system 100 may include a BS 101 and a UE 105. Furthermore, the BS 101 is further configured with two TRPs (e.g., TRP 103*a* and TRP 103*b*). Although only one BS, two TRPs, and one UE are shown for simplicity, it should be noted that the wireless communication system 100 may further include additional BSs, TRPs, and UEs.

The BS 101 may be a gNB in some scenarios (e.g. in 5G application scenario). The TRP 103*a* and TRP 103*b* may connect the BS 101, via, for example, a backhaul link. Each TRP can serve the UE 105. As shown in FIG. 1, TRP 103*a* and TRP 103*b* can serve the UE 105 within a serving area or region (e.g., a cell or a cell sector). The TRP 103*a* and TRP 103*b* can communicate to each other via, for example, a backhaul link. In some cases, the backhaul link is an ideal backhaul link; in some other cases, the backhaul link is a non-ideal backhaul link. It should be understood that the TRP 103*a* and TRP 103*b* configured for the BS 101 may be transparent to the UE 105.

In some embodiments of the present disclosure, the BS 101 may be distributed over a geographic region. In certain embodiments, the BS 101 may also be referred to as an access point, an access terminal, a base, a macro cell, a Node-B, an enhanced Node B (eNB), a gNB, a Home Node-B, a relay node, or any device described using other terminology used in the art.

The UE 105 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UE 105 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 105 may include wearable devices, such as smart watches, fitness bands, optical head-mounted displays, or the like. Moreover, the UE 105 may be referred to as a subscriber unit, a mobile phone, a mobile station, a user, a terminal, a mobile terminal, a wireless terminal, a fixed terminal, a subscriber station, a user terminal, or any device described using other terminology used in the art. The UE 105 may communicate directly with the BS 101 via uplink communication signals.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In one embodiment, the wireless communication system 100 is compatible with the 5G NR of the 3GPP protocol, wherein the BS 101 transmit data using an orthogonal frequency division multiplexing (OFDM) modulation scheme on the downlink and the UE 105 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, the BS 101 may communicate using other communication protocols, such as the IEEE 802.11 family of wireless communication protocols. Further, in some embodiments of the present application, the BS 101 may communicate over licensed spectrums, whereas in other embodiments, the BS 101 may communicate over unlicensed spectrums. The present application is not intended to be limited to the implementation of any particular wireless communication system architecture or protocol. In yet some embodiments of present application, the BS 101 may communicate with the UE 105 using the 3GPP 5G protocols.

In NR R15 or R16, beam failure recovery can be triggered to recovery the failed link only if all the beams configured as beam failure detection resources are failed. However, in the case of multiple TRPs with non-ideal backhaul, when all the beams configured as beam failure detection resources associated with one TRP are failed, all the transmission associated with this TRP will be blocked since there is no way to recovery it by using the legacy beam failure recovery procedure in NR R15. The legacy beam failure recovery procedure is drafted in Chapter 6 of 3GPP TS 38.213. The content of 3GPP TS 38.213 is herein incorporated by reference. Therefore, beam failure recovery in multi-DCI based multiple TRPs should be enhanced to improve the robustness of each link between a UE and a TRP.

TRP-specific beam failure recovery is only worked on the scenario of multi-DCI based multiple TRPs since only in this case, it's highly possible that there is a large delay between two TRPs. Besides, two different CORESETPoolIndex values will be configured for CORESETs to identify two different TRPs in multi-DCI based multiple TRPs specified in R16 MIMO. It should be understood that the methods disclosed below according to the embodiments of the present application can be applied to the case of more than 2 TRPs.

Figure 2:
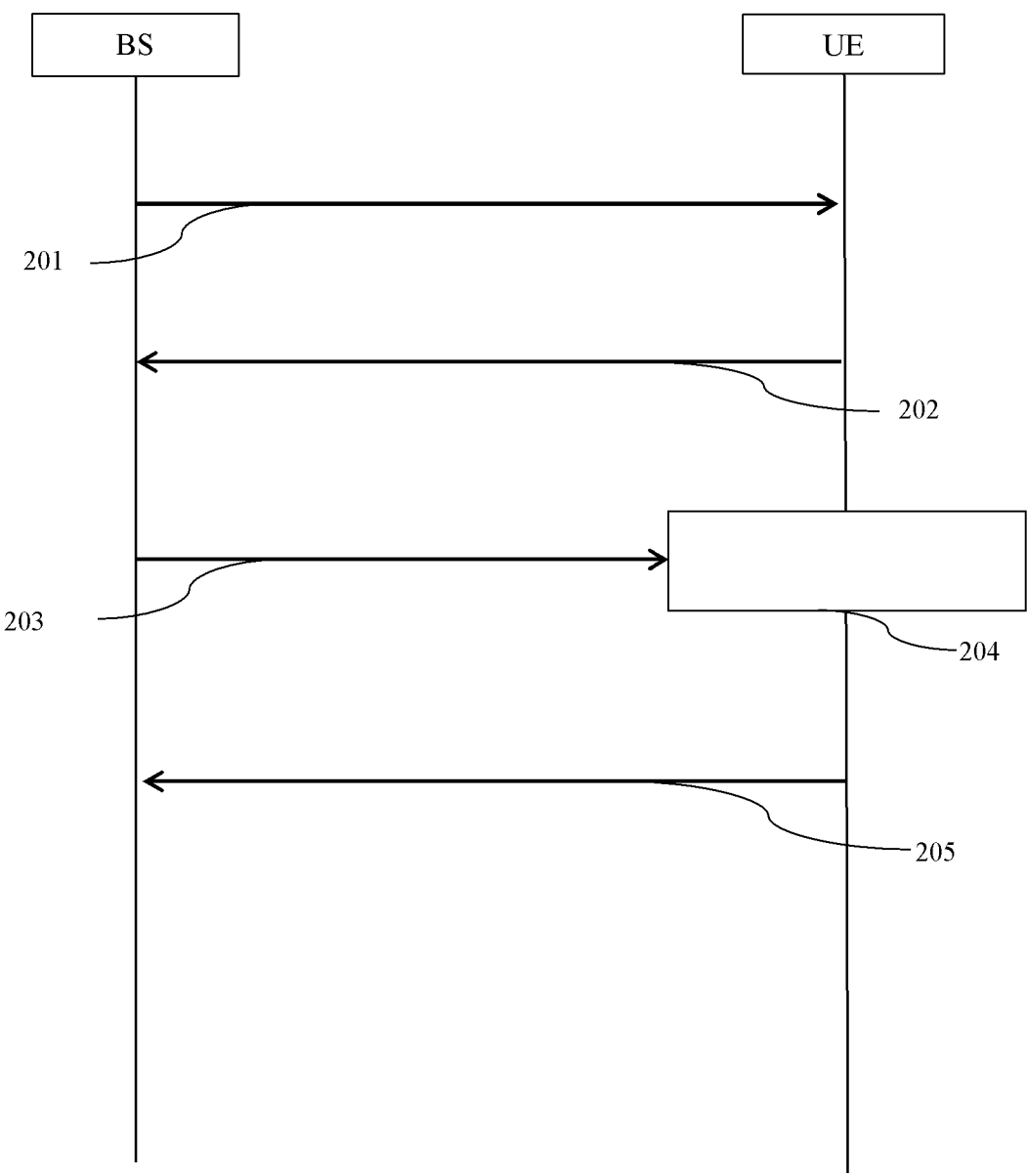
FIG. 2 is a flow chart illustrating a method for beam failure recovery in multi-DCI based multiple TRPs according to some embodiments of the present application.

FIG. 2 is a flow chart illustrating a method for beam failure recovery in multi-DCI based multiple TRPs according to some embodiments of the present application. The method in FIG. 2 may be performed between a BS (such as, the BS 101 in FIG. 1) and the UE (such as, the UE 105 in FIG. 1) in the wireless communication system 100 in FIG. 1.

As shown in FIG. 2, in step 201, a BS may transmit a configuration to the UE, the configuration includes a plurality of sets of failure detection beams and a plurality of sets of candidate beams, and each set of failure detection beams and each set of candidate beams are associated with one of a plurality of CORESETPoolIndex values. The CORESETPoolIndex value can be deemed as a resource index value. In some embodiments, the CORESETPoolIndex values may be replaced by index values indicating other resource for transmission and/or reception.

In particular, each TRP should have a set of failure detection beams (q0) for detecting the beam failure of the TRP. Each CORESETPoolIndex value can be used to identify a TRP. Therefore, each set of failure detection beams (q0) is configured to be associated with each CORESETPoolIndex value.

In an embodiment, a set of failure detection beams (q0) may be configured by RRC signaling explicitly. For example, a set of failure detection beams (q0) may be a set of periodic channel state information-reference signal (CSI-RS) resource configuration indexes configured by RRC signaling.

If there is no set of failure detection beams configured by RRC, the set of failure detection beams (q0) may be indicated by the transmission configuration indicator (TCI) states of the CORESETs associated with the CORESETPoolIndex value implicitly. In an example, the set of failure detection beams (q0) associated with each CORESET-PoolIndex value may be a set of periodic CSI-RS resource configuration indexes with the same values as reference signal (RS) indexes in RS sets indicated by TCI-State for control resource sets (CORESETs) associated with the same CORESETPoolIndex value if there is only one RS index in a TCI state. In another example, the set of failure detection beams (q0) associated with each CORESETPoolIndex value may be a set of periodic CSI-RS resource configuration indexes with same values as RS indexes with quasi co-location (QCL)-TypeD configuration for the corresponding TCI states for all CORESETs associated with the same CORESETPoolIndex value (if there are two RS indexes in a TCI state of any CORESET associated with the same CORESETPoolIndex value).

Each TRP should be configured with a set of candidate beams (q1) to be used as the new beam for the TRP when all beams in the set of failure detection beams for this TRP are failed. In an embodiment, the set of candidate beams (q1) may be a set of periodic CSI-RS resource configuration indexes. In another embodiment, the set of candidate beams (q1) may be a set of synchronization signal (SS)/physical broadcast channel (PBCH) block indexes.

When all beams in a set of failure detection beams associated with a CORESETPoolIndex value are failed in a slot, the UE transmits a beam failure recovery request in an uplink transmission.

In an embodiment, a PRACH resource pool is configured and each beam in the set of the candidate beams is associated with a PRACH resource. In step 202, when the UE determines that all beams in a set of failure detection beams associated with a CORESETPoolIndex value are failed in a slot, for example, when a radio link quality of each beam in the set of failure detection beams is worse (or lower) than a threshold, and a new beam in the corresponding set of candidate beams (q1) associated with the same CORESET-PoolIndex value is found, for example, the power (such as, L1-RSRP) of the new beam in the set of candidate beams is larger than or equal to a threshold, the UE transmits a beam failure recovery request in the PRACH determined by the new beam, where the antenna port quasi co-location (QCL) parameters are associated with periodic CSI-RS resource configuration or with SS/PBCH block associated with the new beam. For example, the beam failure recovery request may indicate that there is a beam failure associated with a CORESETPoolIndex value and the new beam is $q_{new}$ in slot n.

If all beams in a set of failure detection beams associated with a CORESETPoolIndex value are failed but a new beam cannot be found in the corresponding set of candidate beams (q1) associated with the same CORESETPoolIndex, the UE may indicate the status to another TRP (such as the TRP which is identified by another CORESETPoolIndex value whose beam is not failed) by higher layer signaling (such as, MAC CE or RRC). Then the BS can deactivate the TRP whose beams are all failed without new beam found by RRC signaling. If all TRPs are failed but no new beam can be found for any TRP, then initial access will be performed.

In network side, each recovery search space is configured to be associated with a different CORESETPoolIndex value of a plurality of CORESETPoolIndex values.

After receiving the beam failure recovery request from the UE, for example, the beam failure recovery request indicates that there is a beam failure associated with a CORESET-PoolIndex value and the new beam is $q_{new}$ in slot n, in step 203, the BS transmits a physical downlink control channel (PDCCH) in a recovery search space associated with the CORESETPoolIndex value by using the same antenna port quasi-collocation parameters as the ones associated with the new beam $q_{new}$.

For the UE, in step 204, the UE monitors a PDCCH in a recovery search space associated with the CORESET-PoolIndex value by using the same antenna port quasi-collocation parameters as the ones associated with new beam $q_{new}$ starting from slot n+4 within a window configured by RRC signaling, such as BeamFailureRecoveryConfig.

After transmitting the response in the PDCCH (a first PDCCH reception) by the BS, the BS may further transmit PDCCH in all CORESETs associated with the CORESET-PoolIndex value by using the same antenna port quasi-collocation parameters as the ones associated with the new beam $q_{new}$.

Accordingly, after a number of symbols from a last symbol of the PDCCH (a first PDCCH reception), in step 205, the UE monitors PDCCH in all CORESETs associated with the CORESETPoolIndex value by using the same antenna port quasi-collocation parameters as the ones associated with the new beam $q_{new}$, and then the UE transmits a physical uplink control channel (PUCCH) resource associated with the CORESETPoolIndex value by using the new beam and a power determined based on the new beam and a closed loop index corresponding to the CORESETPoolIndex value. The number of symbols may be predefined or configured by RRC signaling. In an example, the number of the symbols may be 28. It is worth noted that the 28 symbols mentioned above or hereinafter may be replaced by another number of symbols, a plurality of slots or a time period which depends on situation or design rules. Accordingly, the BS may receive a PUCCH resource associated with the CORESETPoolIndex value by using the same antenna port quasi-collocation parameters as the ones associated with the beam, where the power of the PUCCH resource is determined based on the beam and a closed loop index corresponding to the CORESETPoolIndex value.

That is, the UE monitors PDCCH in all CORESETs associated with the CORESETPoolIndex value by using the same antenna port quasi-collocation parameters as the ones associated with new beam and transmits a PUCCH resource associated with the CORESETPoolIndex value using a same spatial domain filter as the one corresponding to the new beam for periodic CSI-RS or SS/PBCH block reception, and using the new beam as the pathloss reference RS resource and the CORESETPoolIndex value as the closed loop index, after a number of symbols from a last symbol of the PDCCH. The number of symbols may be predefined or configured by RRC signaling.

In an example, for each CORESETPoolIndex, the UE's behaviour after receiving the BS's response is as follows:

After a number of symbols from a last symbol of a first PDCCH reception in a recovery search space set associated with a CORESETPoolIndex value where a UE detects a DCI format with CRC scrambled by cell-radio network temporary identifier (C-RNTI) or modulation coding scheme cell-RNTI (MCS-C-RNTI), the UE assumes the same antenna port quasi-collocation parameters as the ones associated with index $q_{new}$ selected from the set q1 associated with the CORE-SETPoolIndex value for PDCCH monitoring in all CORESETs associated with the CORESETPoolIndex value.

And after a number of symbols from a last symbol of a first PDCCH reception in a recovery search space set associated with a CORESETPoolIndex value where the UE detects a DCI format with CRC scrambled by C-RNTI or MCS-C-RNTI and until the UE receives an activation command for PUCCH-SpatialRelationInfo or is provided PUCCH-SpatialRelationInfo for PUCCH resource(s), the UE transmits a PUCCH associated with the CORESETPoolIndex value on a same cell as the PRACH transmission using a same spatial filter as for the last PRACH transmission associated with the CORESETPoolIndex value a power determined as described in Clause 7.2.1 (of 3GPP TS 38. 213) with $q_u=0$, $q_d=q_{new}$, and $l=$the CORESETPoolIndex value.

Where $q_{new}$, is a new beam selected from the set q1 associated with the CORESETPoolIndex value.

Figure 3:
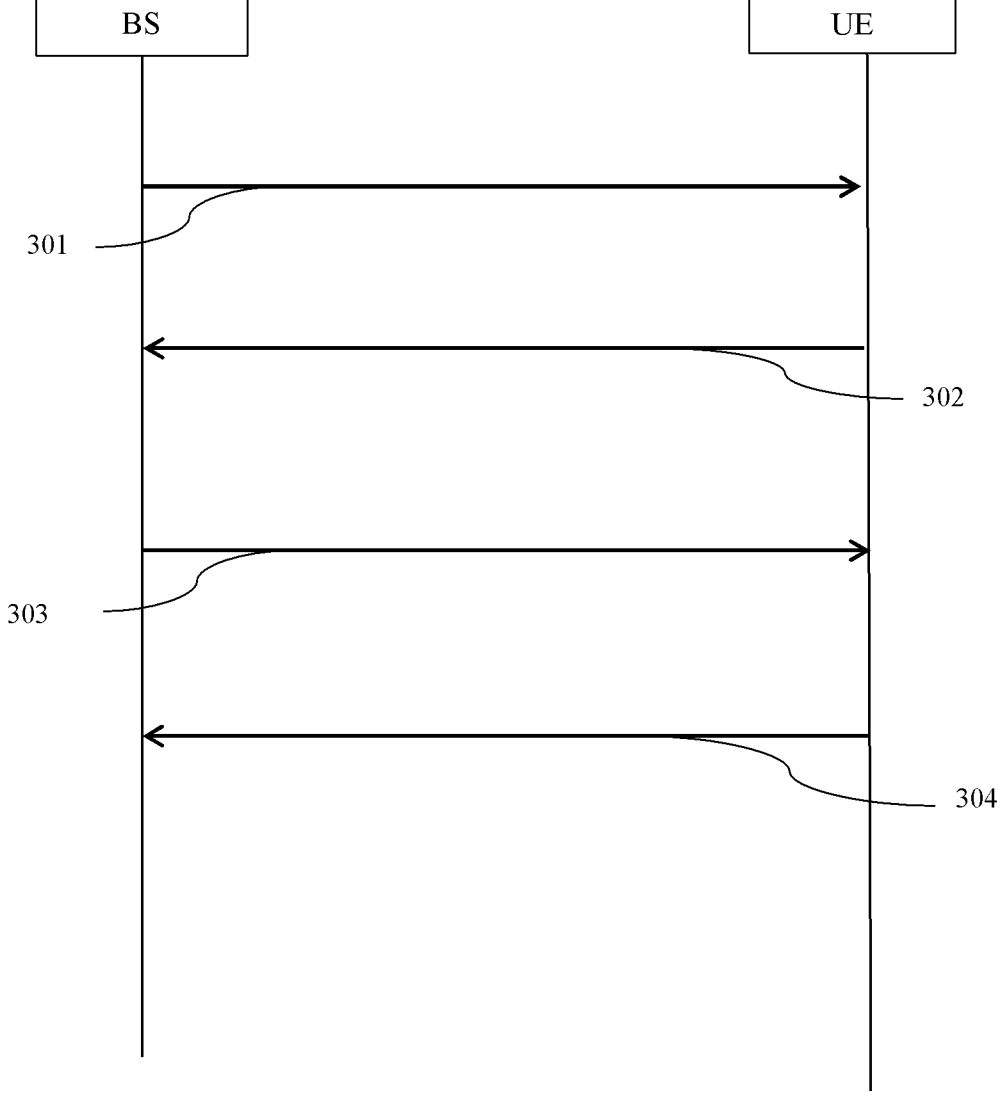
FIG. 3 is another flow chart illustrating a method for beam failure recovery in multi-DCI based multiple TRPs according to some other embodiments of the present application.

FIG. 3 is a flow chart illustrating another method for beam failure recovery in multi-DCI based multiple TRPs according to some other embodiments of the present application. The method in FIG. 3 may be performed between a BS (such as, the BS 101 in FIG. 1) and the UE (such as, the UE 105 in FIG. 1) in the wireless communication system 100 in FIG. 1.

As shown in FIG. 3, in step 301, a BS may transmit a configuration to the UE, the configuration includes a plurality of sets of failure detection beams and a plurality of sets of candidate beams, and each set of failure detection beams and each set of candidate beams are associated with one of a plurality of CORESETPoolIndex values. In particular, each TRP should have a set of failure detection beams (q0) for detecting the beam failure of the TRP. Each CORESETPoolIndex value can identify a TRP. Therefore, each set of failure detection beams (q0) is configured to be associated with each CORESETPoolIndex value.

When all beams in a set of failure detection beams associated with a CORESETPoolIndex value are failed in a slot, the UE transmits a beam failure recovery request in an uplink transmission. In step 302, when the UE determines that all beams in a set of failure detection beams associated with a CORESETPoolIndex value (such as, CORESETPoolIndex 0, which is used to identify TRP 1) are failed, for example, when a radio link quality of each beam in the set of failure detection beams is worse than a threshold, and a new beam in the corresponding set of candidate beams (q1) associated with CORESETPoolIndex 0 is found, for example, the power (such as, L1-RSRP) of the new beam in the set of candidate beams is larger than or equal to a threshold, the UE transmits a beam failure recovery request in a physical uplink shared channel (PUSCH) associated with another CORESETPoolIndex value (such as, CORESETPoolIndex 1, which is used to identify TRP 2) carrying a medium access control (MAC) control element (CE) to indicate a new beam from the set of candidate beams associated with CORESETPoolIndex 0.

If there is no new beam found from the set of candidate beams (q1) associated with CORESETPoolIndex 0, the UE transmits no new beam indication information in a PUSCH associated with CORESETPoolIndex 1 carrying a MAC CE to indicate that there is no new beam.

That is, the MAC CE should be carried in a PUSCH transmitted to the TRP identified by CORESETPoolIndex 1. Therefore, the PUSCH carrying the MAC CE carrying the new beam index or no new beam indication information for TRP 1 identified by CORESETPoolIndex 0 is associated with CORESETPoolIndex 1.

In some other embodiments, the MAC CE may also further indicate CORESETPoolIndex 0 except for the new beam or no new beam indication information.

After receiving the beam failure recovery request from the UE, for example, the beam failure recovery request indicates that there is a beam failure associated with CORESETPoolIndex 0 and the new beam is $q_{new}$ in slot n (or no new beam indication from the set q1 associated with CORESETPoolIndex 0), in step 303, the BS transmits a downlink control information (DCI) in a PDCCH associated with CORESETPoolIndex 1 to schedule a PUSCH transmission with a same hybrid automatic repeat request (HARQ) process number as for the transmission of the PUSCH and having a toggled new data indicator (NDI) field value. That is, the PDCCH carrying the DCI is transmitted in a CORESET associated with CORESETPoolIndex 1 which is different from CORESETPoolIndex 0.

After transmitting the DCI in the PDCCH by the BS, the BS may further transmit PDCCH in all CORESETs associated with CORESETPoolIndex 0 by using the same antenna port quasi-collocation parameters as the ones associated with the new beam $q_{new}$.

Accordingly, after a number of symbols from a last symbol of the PDCCH (a PDCCH reception), in step 304, the UE monitors a PDCCH in all CORESETs associated with CORESETPoolIndex 0 by using the same antenna port quasi-collocation parameters as the ones associated with the new beam $q_{new}$, and then the UE transmits a PUCCH resource associated with CORESETPoolIndex 0 by using the new beam and a power determined based on the new beam and a closed loop index (such as closed loop index 0) associated with CORESETPoolIndex 0. The number of symbols may be predefined or configured by RRC signaling. In an example, the number of the symbols may be 28. Accordingly, the BS may receive PUCCH resource associated with CORESETPoolIndex 0 by using the same antenna port quasi-collocation parameters as the ones associated with the new beam $q_{new}$, where the power of the PUCCH resource is determined based on the new beam $q_{new}$ and a closed loop index (such as closed loop index 0) associated with CORESETPoolIndex 0.

That is, UE monitors PDCCH in all CORESETs associated with the CORESETPoolIndex value by using the same antenna port quasi-collocation parameters as the ones associated with new beam and transmits a PUCCH resource associated with the CORESETPoolIndex value using a same spatial domain filter as the one corresponding to the new beam for periodic CSI-RS or SS/PBCH block reception, and using the new beam as the pathloss reference RS resource and the CORESETPoolIndex value as the closed loop index, after a number of symbols from a last symbol of the PDCCH. The number of symbols may be predefined or configured by RRC signaling.

In an example, for each CORESETPoolIndex value, the UE behaviour after receiving the gNB's response is as follows:

After a number of symbols from a last symbol of a PDCCH reception with a DCI format scheduling a PUSCH transmission with a same HARQ process number as for the transmission of the PUSCH carrying the MAC CE indicating the BFR associated with a CORESETPoolIndex value and having a toggled NDI field value, the UE monitors PDCCH in all CORESETs associated with the CORESETPoolIndex value using the same antenna port quasi co-location parameters as the one associated with the corresponding index $q_{new}$ selected from the set q1 associated with the CORESETPoolIndex value, if any transmits PUCCH associated with the CORESET-PoolIndex value using a same spatial domain filter as the one corresponding to $q_{new}$ selected from the set q1 associated with the CORESETPoolIndex value for periodic CSI-RS or SS/PBCH block reception, and using a power determined as described in Clause 7.2.1 (of 3GPP TS 38.213) with $q_u=0$, $q_d=q_{new}$, and l=the CORESETPoolIndex value.

In the following description, with respect to the method for beam failure recovery in multi-DCI based multiple TRPs, the case of two TRPs will be described in detail in FIGS. 4-6 in connection with the exemplary embodiments of the present application for simplicity; however, it should be noted that the methods for beam failure recovery in multi-DCI based multiple TRPs disclosed below can be extended to the case of more than 2 TRPs.

Figure 4:
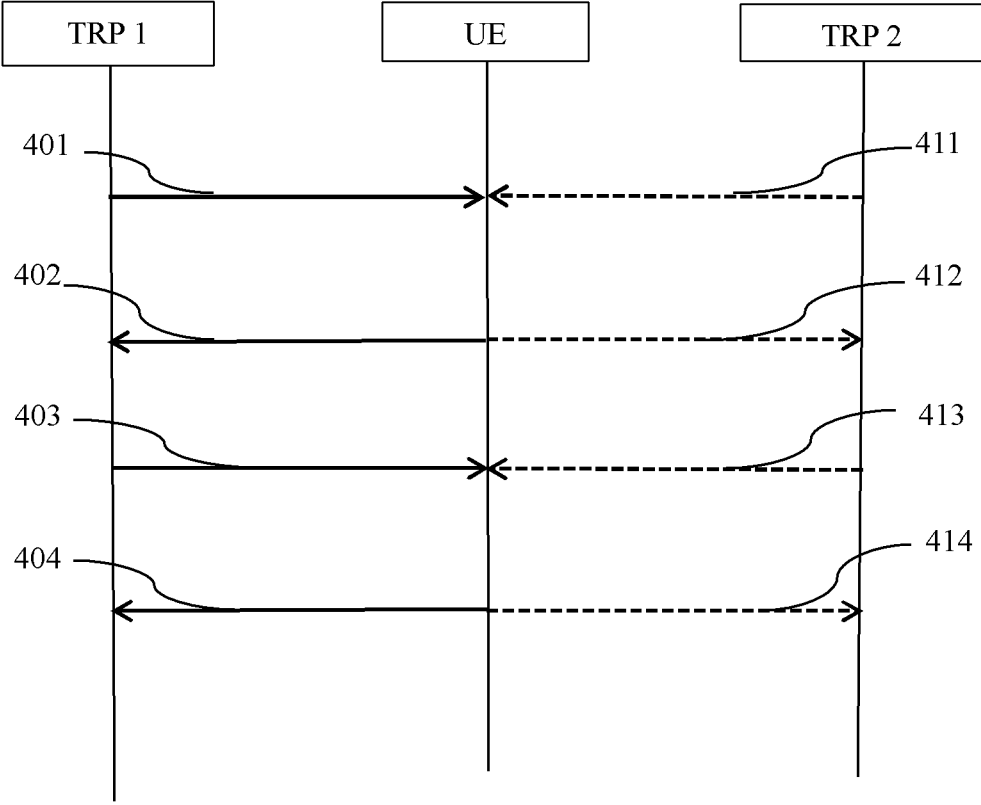
FIG. 4 illustrates an exemplary flow chart of a method for beam failure recovery in multi-DCI based multiple TRPs according to an embodiment of the present application.

FIG. 4 illustrates an exemplary flow chart of a method for beam failure recovery in multi-DCI based multiple TRPs according to an embodiment of the present application. The method in FIG. 4 may be performed among a first TRP (such as, TRP 1 in FIG. 1), a second TRP (such as, TRP 2 in FIG. 1) and the UE (such as, the UE 105 in FIG. 1) in the wireless communication system 100 in FIG. 1.

In FIG. 4, it assumes that there are two TRPs, TRP 1 is identified by CORESETPoolIndex 0 and TRP 2 is CORESETPoolIndex 1. Two failure detection resource sets (q0) and two candidate resource sets (q1) are configured, where a first set q0 and a first set q1 are associated with CORESETPoolIndex 0, and a second set q0 and a second set q1 are associated with CORESETPoolIndex 1.

As shown in FIG. 4, in step 401, TRP 1 transmits a configuration including a first set q0 and a first set q1 associated with CORESETPoolIndex 0 to the UE. Similarly, in step 411, TRP 2 transmits a configuration including a second set q0 and a second set q1 associated with CORESETPoolIndex 1.

A PRACH resource pool is configured where each beam in the two configured candidate resource sets (q1) is associated with a PRACH resource. Furthermore, two recovery search spaces are configured in two CORESETs where each CORESET is associated with a different CORESETPoolIndex value. In FIG. 4, recovery search space 0 is associated with CORESETPoolIndex 0 and recovery search space 1 is associated with CORESETPoolIndex 1.

In step 402, when the UE determines that all beams in the first set q0 associated with CORESETPoolIndex 0 are failed and a new beam $q_{new}$ in the first set q1 associated with CORESETPoolIndex 0 is found, then the UE will transmit a beam failure recovery request to the BS (actually, to TRP 1) by a PRACH resource from the PRACH resource pool configured for TRP-specific beam failure recovery associated with the new beam $q_{new}$ selected from the first set q1 associated with CORESETPoolIndex 0.

In step 403, after receiving the beam failure recovery request, TRP 1 will transmit a DCI in a PDCCH in recovery search space 0 to confirm the beam failure recovery of TRP 1.

The UE will monitor and detect the DCI in recovery search space 0 by assuming same antenna port quasi-collocation parameters as the ones associated with index of the new beam $q_{new}$ selected from the first set q1 associated with CORESETPoolIndex 0 starting from the slot which is 4 slots after the slot transmitting the PRACH within a window configured by RRC signaling, such as, BeamFailureRecoveryConfig.

After transmitting the DCI in the PDCCH by the TRP 1, the TRP 1 may further transmit PDCCH in all CORESETs associated with CORESETPoolIndex 0 by using the same antenna port quasi-collocation parameters as the ones associated with the new beam $q_{new}$.

And then in step 404, after a number of symbols from a last symbol of the PDCCH carrying the DCI, the UE assumes same antenna port quasi-collocation parameters as the ones associated with index $q_{new}$, selected from the set q1 associated with CORESETPoolIndex 0 for PDCCH monitoring in all CORESETs associated with CORESETPoolIndex 0, and until the UE receives an activation command for PUCCH-SpatialRelationInfo or is provided PUCCH-SpatialRelationInfo for PUCCH resource(s), the UE transmits a PUCCH associated with CORESETPoolIndex 0 on a same cell as the PRACH transmission using a same spatial filter as for the last PRACH transmission associated with CORESETPoolIndex 0 and a power determined as described in Clause 7.2.1 of 3GPP TS 38. 213 with $q_u=0$, $q_d=q_{new}$, and l=0. The number of symbols may be predefined or configured by RRC signaling. In an example, the number of the symbols may be 28. Accordingly, the TRP 1 may receive the PUCCH associated with CORESETPoolIndex 0 by using the same antenna port quasi-collocation parameters as the ones associated with index $q_{new}$, where the power of the PUCCH is determined as described in Clause 7.2.1 of 3GPP TS 38. 213 with $q_u=0$, $q_d=q_{new}$, and l=0.

Similarly, in step 412, when the UE determines that the second set q0 associated with CORESETPoolIndex 1 is failed and a new beam $q_{new}$ in the second set q1 associated with CORESETPoolIndex 1 is found, then the UE will transmit a beam failure recovery request to the BS by a PRACH resource from the PRACH resource pool configured for TRP-specific beam failure recovery associated with the new beam $q_{new}$ selected from the second set q1 associated with CORESETPoolIndex 1.

In step 413, after receiving the beam failure recovery request, TRP 2 will transmit a DCI in a PDCCH in recovery search space 1 to confirm the beam failure recovery of TRP 2.

UE will detect the DCI in recovery search space 1 by assuming same antenna port quasi-collocation parameters as the ones associated with index $q_{new}$ selected from the set q1 associated with CORESETPoolIndex 1.

After transmitting the DCI in the PDCCH by the TRP 2, the TRP 2 may further transmit PDCCH in all CORESETs associated with CORESETPoolIndex 1 by using the same antenna port quasi-collocation parameters as the ones associated with the new beam $q_{new}$.

And then in step 414, after a number of symbols from a last symbol of the PDCCH carrying the DCI, the UE assumes same antenna port quasi-collocation parameters as the ones associated with index $q_{new}$, selected from the set q1 associated with CORESETPoolIndex 1 for PDCCH monitoring in all CORESETs associated with CORESETPoolIndex 1, and until the UE receives an activation command for PUCCH-SpatialRelationInfo or is provided PUCCH-SpatialRelationInfo for PUCCH resource(s), the UE transmits a PUCCH associated with CORESETPoolIndex 1 on a same cell as the PRACH transmission using a same spatial filter as for the last PRACH transmission associated with CORESETPoolIndex 1 and a power determined as described in Clause 7.2.1 of 3GPP TS 38.213 with $q_u=0$, $q_d=q_{new}$, and l=1. The number of symbols may be predefined or configured by RRC signaling. In an example, the number of the symbols may be 28. Accordingly, the TRP 2 may receive the PUCCH associated with CORESETPoolIndex 1 by using the same antenna port quasi-collocation parameters as the ones associated with index $q_{new}$, where the power of the PUCCH is determined as described in Clause 7.2.1 of 3GPP TS 38.213 with $q_u=0$, $q_d=q_{new}$, and $l=1$.

Figure 5:
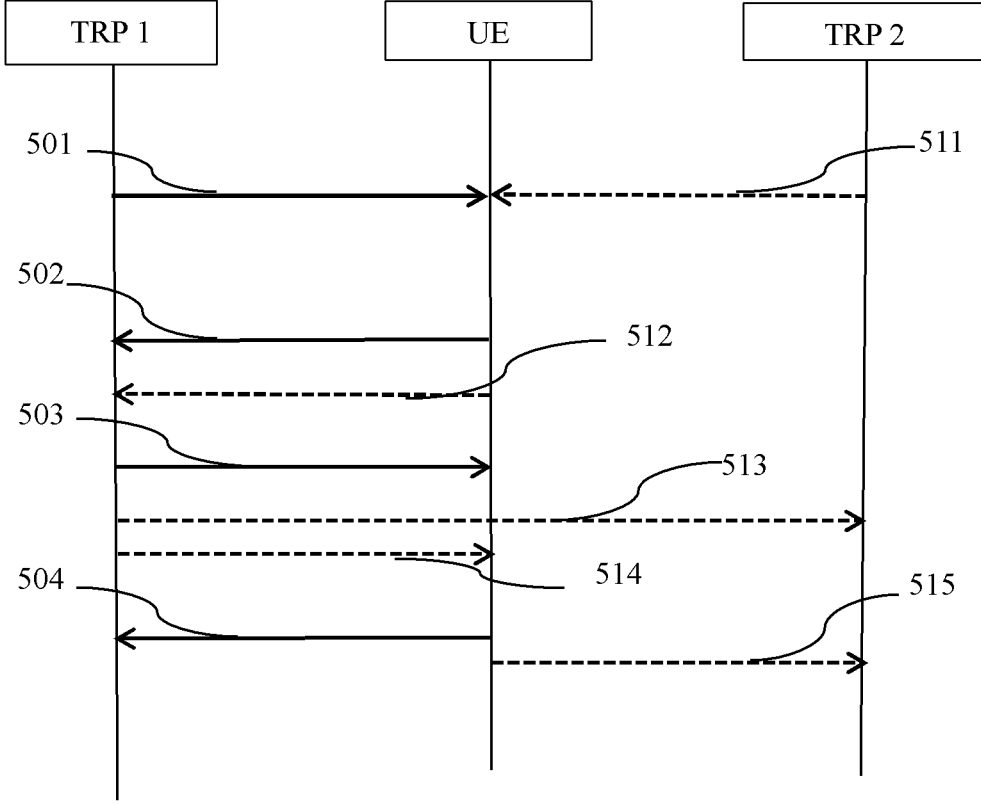
FIG. 5 illustrates another exemplary flow chart of a method for beam failure recovery in multi-DCI based multiple TRPs according to another embodiment of the present application.

FIG. 5 illustrates another exemplary flow chart of a method for beam failure recovery in multi-DCI based multiple TRPs according to another embodiment of the present application. The method in FIG. 5 may be performed among a first TRP (such as, TRP 1 in FIG. 1), a second TRP (such as, TRP 2 in FIG. 1) and the UE (such as, the UE 105 in FIG. 1) in the wireless communication system 100 in FIG. 1.

In FIG. 5, it assumes that there are two TRPs, TRP 1 is identified by CORESETPoolIndex 0 and TRP 2 is identified by CORESETPoolIndex 1. Two failure detection resource sets (q0) and two candidate resource sets (q1) are configured, where a first set q0 and a first set q1 are associated with CORESETPoolIndex 0, and a second set q0 and a second set q1 are associated with CORESETPoolIndex 1.

As shown in FIG. 5, in step 501, TRP 1 transmits a configuration including a first set q0 and a first set q1 associated with CORESETPoolIndex 0 to the UE. Similarly, in step 511, TRP 2 transmits a configuration including a second set q0 and a second set q1 associated with CORESETPoolIndex 1.

A PRACH resource pool is configured where each beam in the configured candidate resource set (the first set q1) associated with CORESETPoolIndex 0 is associated with a PRACH resource. Furthermore, one recovery search space (such as, recovery search space 0) is configured in a CORESET and is associated with CORESETPoolIndex 0.

In step 502, when the UE determines that all beams in the first set q0 associated with CORESETPoolIndex 0 are failed and a new beam $q_{new}$ in the first set q1 associated with CORESETPoolIndex 0 is found, then the UE will transmit a beam failure recovery request to the BS (actually, to TRP 1) by a PRACH resource from the PRACH resource pool configured for TRP-specific beam failure recovery associated with the new beam $q_{new}$ selected from the first set q1 associated with CORESETPoolIndex 0.

In step 503, after receiving the beam failure recovery request, TRP 1 will transmit a DCI in a PDCCH in recovery search space 0 to confirm the beam failure recovery of TRP 1.

The UE will detect the DCI in recovery search space 0 by assuming same antenna port quasi-collocation parameters as the ones associated with index of the new beam $q_{new}$ selected from the first set q1 associated with CORESETPoolIndex 0.

After transmitting the DCI in the PDCCH by the TRP 1, the TRP 1 may further transmit PDCCH in all CORESETs associated with CORESETPoolIndex 0 by using the same antenna port quasi-collocation parameters as the ones associated with the new beam $q_{new}$.

And then in step 504, after a number of symbols from a last symbol of the PDCCH carrying the DCI, the UE assumes same antenna port quasi-collocation parameters as the ones associated with index $q_{new}$ selected from the set q1 associated with CORESETPoolIndex 0 for PDCCH monitoring in all CORESETs associated with CORESETPoolIndex 0, and until the UE receives an activation command for PUCCH-SpatialRelationInfo or is provided PUCCH-SpatialRelationInfo for PUCCH resource(s), the UE transmits a PUCCH associated with CORESETPoolIndex 0 on a same cell as the PRACH transmission using a same spatial filter as for the last PRACH transmission associated with CORESETPoolIndex 0 and a power determined as described in Clause 7.2.1 of 3GPP TS 38.213 with $q_u=0$, $q_d=q_{new}$, and $l=0$. The number of symbols may be predefined or configured by RRC signaling. In an example, the number of the symbols may be 28. Accordingly, the TRP 1 may receive the PUCCH associated with CORESETPoolIndex 0 by using the same antenna port quasi-collocation parameters as the ones associated with index $q_{new}$, where the power of the PUCCH is determined as described in Clause 7.2.1 of 3GPP TS 38. 213 with $q_u=0$, $q_d=q_{new}$w, and $l=0$.

In another aspect, when the UE detects that all beams in the second set q0 associated with CORESETPoolIndex 1 are failed and a new beam $q_{new}$ in the second set q1 associated with CORESETPoolIndex 1 is found, in step 512, the UE transmits a beam failure recovery request associated with the TRP 2 to the TRP 1, by a PUSCH associated with CORESETPoolIndex 0 carrying a MAC CE to indicate the new beam $q_{new}$ selected from the second set q1 associated with CORESETPoolIndex 1.

If there is no new beam found from the second set q1 associated with CORESETPoolIndex 1, the UE transmits no new beam indication information in a PUSCH associated with CORESETPoolIndex 0 carrying a MAC CE to indicate that there is no new beam.

After receiving the beam failure recovery request from the UE, in step 513, the TRP 1 may transmit the information regarding the new beam $q_{new}$ in the second set q1 associated with CORESETPoolIndex 1 to the TRP 2 by backhaul link between the TRP 1 and the TRP 2. In another embodiment, the TRP 1 may transmit the no new beam indication information to the TRP 2.

In step 514, the TRP 1 may also transmit a response by a DCI in a PDCCH to schedule a new PUSCH with the same HARQ process number as for the PUSCH carrying the MAC CE, to the UE. Besides, the TRP 1 may also transmit the response to the TRP 2 by the backhaul link so that the TRP 2 may communicate with the UE by using the new beam $q_{new}$ in the following communication.

After receiving the response from the TRP 1, the TRP 2 may transmit PDCCH in all CORESETs associated with CORESETPoolIndex 1 by using the same antenna port quasi-collocation parameters as the ones associated with the new beam $q_{new}$.

After a number of symbols from a last symbol of the DCI in the PDCCH, in step 515, the UE monitors PDCCH in all CORESETs associated with CORESETPoolIndex 1 using the same antenna port quasi co-location parameters as the one associated with the corresponding index $q_{new}$ selected from the set q1 associated with CORESETPoolIndex 1, if any, and transmits PUCCH associated with CORESETPoolIndex 1 using a same spatial domain filter as the one corresponding to $q_{new}$ selected from the set q1 associated with CORESETPoolIndex 1 for periodic CSI-RS or SS/PBCH block reception, and using a power determined as described in Clause 7.2.1 of 3GPP TS 38.213 with $q_u=0$, $q_d=q_{new}$, and $l=1$. The number of symbols may be predefined or configured by RRC signaling. In an example, the number of the symbols may be 28. Accordingly, the TRP 2 may receive the PUCCH associated with CORESETPoolIndex 1 by using the same antenna port quasi-collocation parameters as the ones associated with index $q_{new}$, where the power of the PUCCH is determined as described in Clause 7.2.1 of 3GPP TS 38.213 with $q_u=0$, $q_d=q_{new}$, and $l=1$.

Figure 6:
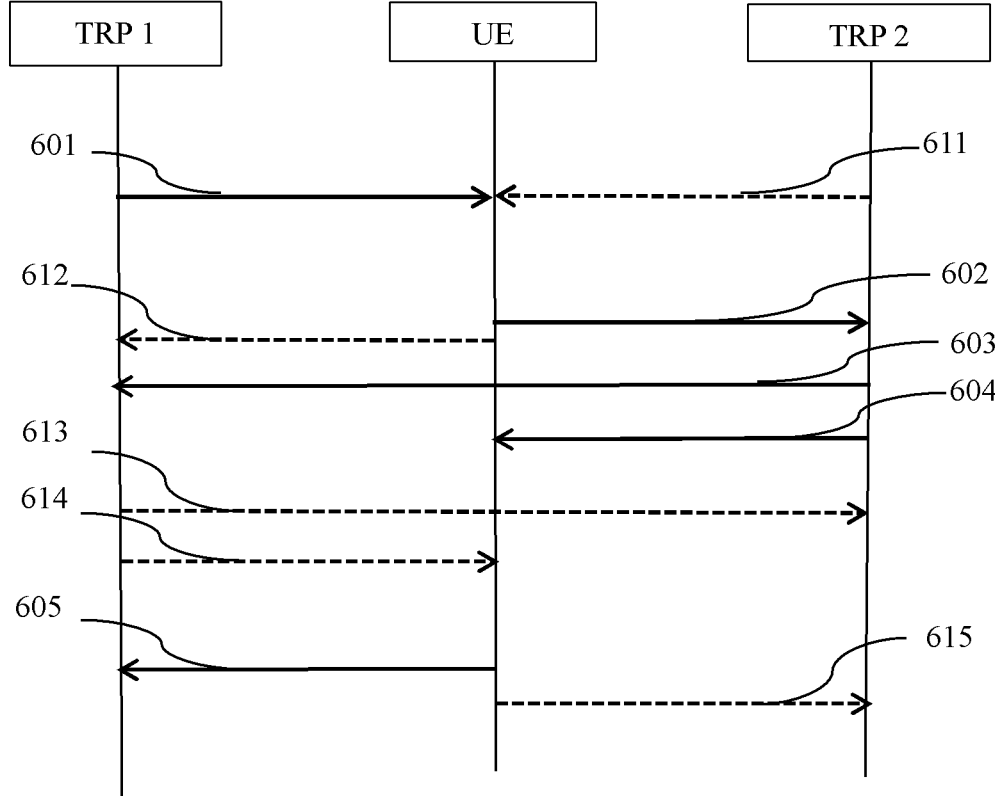
FIG. 6 illustrates yet another exemplary flow chart of a method for beam failure recovery in multi-DCI based multiple TRPs according to yet another embodiment of the present application.

FIG. 6 illustrates yet another exemplary flow chart of a method for beam failure recovery in multi-DCI based multiple TRPs according to yet another embodiment of the present application. The method in FIG. 6 may be performed among a first TRP (such as, TRP 1 in FIG. 1), a second TRP (such as, TRP 2 in FIG. 1) and the UE (such as, the UE 105 in FIG. 1) in the wireless communication system 100 in FIG. 1.

In FIG. 6, it assumes that there are two TRPs, TRP 1 is identified by CORESETPoolIndex 0 and TRP 2 is identified by CORESETPoolIndex 1. Two failure detection resource sets (q0) and two candidate resource sets (q1) are configured, where a first set q0 and a first set q1 are associated with CORESETPoolIndex 0, and a second set q0 and a second set q1 are associated with CORESETPoolIndex 1.

As shown in FIG. 6, in step 601, TRP 1 transmits a configuration including a first set q0 and a first set q1 associated with CORESETPoolIndex 0 to the UE. Similarly, in step 611, TRP 2 transmits a configuration including a second set q0 and a second set q1 associated with CORESETPoolIndex 1.

When the UE detects that all beams in the first set q0 associated with CORESETPoolIndex 0 are failed and a new beam $q_{new}$ in the first set q1 associated with CORESETPoolIndex 0 is found, in step 602, the UE transmits a beam failure recovery request associated with the TRP 1 to the TRP 2, by a PUSCH associated with CORESETPoolIndex 1 carrying a MAC CE to indicate the new beam $q_{new}$ selected from the first set q1 associated with CORESETPoolIndex 0.

If there is no new beam found from the first set q1 associated with CORESETPoolIndex 0, the UE transmits no new beam indication information in a PUSCH associated with CORESETPoolIndex 1 carrying a MAC CE to indicate that there is no new beam.

After receiving the beam failure recovery request from the UE, in step 603, the TRP 2 may transmit the information regarding the new beam $q_{new}$ in the first set q1 associated with CORESETPoolIndex 0 to the TRP 1 by backhaul link between the TRP 1 and the TRP 2. In another embodiment, the TRP 2 may transmit the no new beam indication information to the TRP 1.

In step 604, the TRP 2 may also transmit a response by a DCI in a PDCCH to schedule a new PUSCH with the same HARQ process number as for the PUSCH carrying the MAC CE, to the UE. Besides, the TRP 2 may also transmit the response to the TRP 1 by the backhaul link so that the TRP 1 may communicate with the UE by using the new beam $q_{new}$ in the following communication.

After receiving the DCI in the PDCCH by the TRP 2, the TRP 1 may further transmit PDCCH in all CORESETs associated with CORESETPoolIndex 0 by using the same antenna port quasi-collocation parameters as the ones associated with the new beam $q_{new}$.

After a number of symbols from a last symbol of the DCI in the PDCCH, in step 605, the UE monitors PDCCH in all CORESETs associated with CORESETPoolIndex 0 using the same antenna port quasi co-location parameters as the one associated with the corresponding index $q_{new}$ selected from the set q1 associated with CORESETPoolIndex 0, if any, and transmits PUCCH associated with CORESETPoolIndex 0 using a same spatial domain filter as the one corresponding to $q_{new}$ selected from the set q1 associated with CORESETPoolIndex 0 for periodic CSI-RS or SS/PBCH block reception, and using a power determined as described in Clause 7.2.1 of 3GPP TS 38.213 with $q_u$=0, $q_d$=$q_{new}$, and l=0. The number of symbols may be predefined or configured by RRC signaling. In an example, the number of the symbols may be 28. Accordingly, the TRP 1 may receive the PUCCH associated with CORESETPoolIndex 0 by using the same antenna port quasi-collocation parameters as the ones associated with index $q_{new}$, where the power of the PUCCH is determined as described in Clause 7.2.1 of 3GPP TS 38.213 with $q_u$=0, $q_d$=$q_{new}$, and l=0.

Similarly, when the UE detects that all beams in the second set q0 associated with CORESETPoolIndex 1 are failed and a new beam $q_{new}$ in the second set q1 associated with CORESETPoolIndex 1 is found, in step 612, the UE transmits a beam failure recovery request associated with the TRP 2 to the TRP 1, by a PUSCH associated with CORESETPoolIndex 0 carrying a MAC CE to indicate the new beam $q_{new}$ selected from the second set q1 associated with CORESETPoolIndex 1.

If there is no new beam found from the second set q1 associated with CORESETPoolIndex 1, the UE transmits no new beam indication information in a PUSCH associated with CORESETPoolIndex 0 carrying a MAC CE to indicate that there is no new beam.

After receiving the beam failure recovery request from the UE, in step 613, the TRP 1 may transmit the information regarding the new beam $q_{new}$ in the second set q1 associated with CORESETPoolIndex 1 to the TRP 2 by backhaul link between the TRP 1 and the TRP 2. In another embodiment, the TRP 1 may transmit the no new beam indication information to the TRP 2.

In step 614, the TRP 1 may also transmit a response by a DCI in a PDCCH to schedule a new PUSCH with the same HARQ process number as for the PUSCH carrying the MAC CE, to the UE. Besides, the TRP 1 may also transmit the response to the TRP 2 by the backhaul link so that the TRP 2 may communicate with the UE by using the new beam $q_{new}$ in the following communication.

After receiving the response from the TRP 1, the TRP 2 may transmit PDCCH in all CORESETs associated with CORESETPoolIndex 1 by using the same antenna port quasi-collocation parameters as the ones associated with the new beam $q_{new}$.

After a number of symbols from a last symbol of the DCI in the PDCCH, in step 615, the UE monitors PDCCH in all CORESETs associated with CORESETPoolIndex 1 using the same antenna port quasi co-location parameters as the one associated with the corresponding index $q_{new}$ selected from the set q1 associated with CORESETPoolIndex 1, if any, and transmits PUCCH associated with CORESETPoolIndex 1 using a same spatial domain filter as the one corresponding to $q_{new}$ selected from the set q1 associated with CORESETPoolIndex 1 for periodic CSI-RS or SS/PBCH block reception, and using a power determined as described in Clause 7.2.1 of 3GPP TS 38.213 with $q_u$=0, $q_d$=$q_{new}$, and l=1. The number of symbols may be predefined or configured by RRC signaling. In an example, the number of the symbols may be 28. Accordingly, the TRP 2 may receive the PUCCH associated with CORESETPoolIndex 1 by using the same antenna port quasi-collocation parameters as the ones associated with index $q_{new}$, where the power of the PUCCH is determined as described in Clause 7.2.1 of 3GPP TS 38.213 with $q_u$=0, $q_d$=$q_{new}$, and l=1.

Therefore, through the above described embodiments of the present application, the beam failure recovery in multi-DCI based multiple TRPs can be enhanced to improve the robustness of each link between a UE and each TRP.

Figure 7:
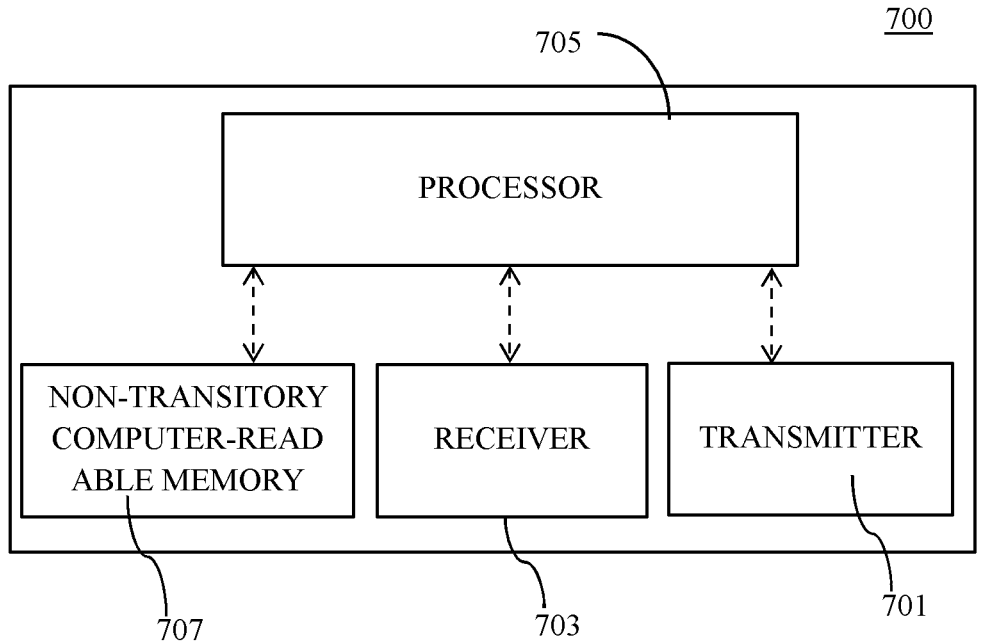
FIG. 7 is a schematic block diagram illustrating an exemplary apparatus according to an embodiment of the present application.

FIG. 7 illustrates an apparatus according to some embodiments of the present application. In some embodiments of the present disclosure, the apparatus 700 may be UE 105 illustrated in FIG. 1 or the UE in other embodiments of the present application.

As shown in FIG. 7, the apparatus 700 may include a receiver 701, a transmitter 703, a processer 705, and a non-transitory computer-readable medium 707. The non-transitory computer-readable medium 707 has computer executable instructions stored therein. The processer 705 is configured to be coupled to the non-transitory computer readable medium 707, the receiver 701, and the transmitter

703. It is contemplated that the apparatus 700 may include more computer-readable mediums, receiver, transmitter and processors in some other embodiments of the present application according to practical requirements. In some embodiments of the present application, the receiver 701 and the transmitter 703 are integrated into a single device, such as a transceiver. In certain embodiments, the apparatus 700 may further include an input device, a memory, and/or other components.

In some embodiments of the present application, the non-transitory computer-readable medium 707 may have stored thereon computer-executable instructions to cause a processor to implement the above methods according to embodiments of the present application.

Figure 8:
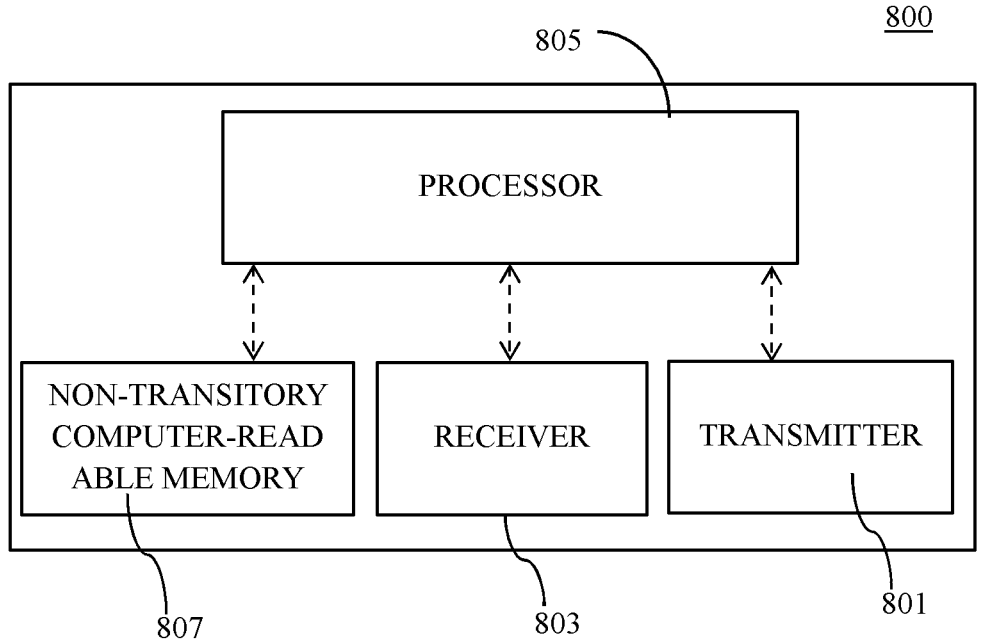
FIG. 8 is a schematic block diagram illustrating another exemplary apparatus according to an embodiment of the present application.

FIG. 8 illustrates an apparatus according to some other embodiments of the present application. In some embodiments of the present disclosure, the apparatus 800 may be BS 101, TRP 103*a* or TRP 103*b* illustrated in FIG. 1 or the BS or TRP in other embodiments of the present application.

As shown in FIG. 8, the apparatus 800 may include a receiver 801, a transmitter 803, a processer 805, and a non-transitory computer-readable medium 807. The non-transitory computer-readable medium 807 has computer executable instructions stored therein. The processer 805 is configured to be coupled to the non-transitory computer readable medium 807, the receiver 801, and the transmitter 803. It is contemplated that the apparatus 800 may include more computer-readable mediums, receiver, transmitter and processors in some other embodiments of the present application according to practical requirements. In some embodiments of the present application, the receiver 801 and the transmitter 803 are integrated into a single device, such as a transceiver. In certain embodiments, the apparatus 800 may further include an input device, a memory, and/or other components.

In some embodiments of the present application, the non-transitory computer-readable medium 807 may have stored thereon computer-executable instructions to cause a processor to implement the above methods according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:

receiving a configuration including a plurality of sets of failure detection beams and a plurality of sets of candidate beams, wherein each set of failure detection beams and each set of candidate beams are associated with one of a plurality of control resource set (CORESET) pool index (CORESETPoolIndex) values;

transmitting a beam failure recovery request in an uplink transmission when all beams in a set of failure detection beams in the plurality of sets of failure detection beams associated with a CORESETPoolIndex value of the plurality of CORESETPoolIndex values fail, wherein the uplink transmission is a transmission by a physical uplink shared channel (PUSCH) carrying a medium access control (MAC) control element (CE) to indicate a beam or no beam from the set of candidate beams associated with the CORESETPoolIndex value, wherein power of the beam in the set of candidate beams is larger than or equal to a threshold, wherein the plurality of CORESETPoolIndex values are two CORESETPoolIndex values including CORESETPoolIndex 0 and CORESETPoolIndex 1 and the CORESETPoolIndex value is CORESETPoolIndex 1, and the uplink transmission is a transmission by a physical uplink shared channel (PUSCH) carrying a medium access control (MAC) control element (CE) to indicate a beam or no beam from the set of candidate beams associated with CORESETPoolIndex 1, wherein power of the beam in the set of candidate beams is larger than or equal to a threshold receiving a downlink control information (DCI) in a physical downlink control channel (PDCCH) to schedule a PUSCH transmission with a same hybrid automatic repeat request (HARQ) process number as for the transmission of the PUSCH and having a toggled new data indicator (NDI) field value and after a number of symbols from a last symbol of the PDCCH:

monitoring PDCCH in all CORESETs associated with CORESETPoolIndex 1 by using the same antenna port quasi-collocation parameters as the ones associated with the beam; and transmitting a physical uplink control channel (PUCCH) resource associated with CORESETPoolIndex 1 by using the beam and a power determined based on the beam and a closed loop index corresponding to CORESETPoolIndex 1.

2. The method of claim 1, wherein a set of failure detection beams associated with the CORESETPoolIndex value includes:

a set of periodic channel state information-reference signal (CSI-RS) resource configuration indexes configured by radio resource control (RRC) signaling;

a set of periodic CSI-RS resource configuration indexes with same values as RS indexes in RS sets indicated by TCI-State for control resource sets (CORESETs) associated with the CORESETPoolIndex value if there is only one RS index in a transmission configuration indicator (TCI) state;

a set of periodic CSI-RS resource configuration indexes with same values as RS indexes with quasi co-location (QCL)-TypeD configuration for the corresponding TCI states if there are two RS indexes in a TCI state of any CORESET associated with the CORESETPoolIndex value;

or any combination thereof.

3. The method of claim 1, wherein a set of candidate beams associated with the CORESETPoolIndex value includes:

a set of periodic CSI-RS resource configuration indexes;

a set of synchronization signal (SS)/physical broadcast channel (PBCH) block indexes;

or a combination thereof.

4. The method of claim 1, further comprising:

receiving a downlink control information (DCI) in a PDCCH to schedule a PUSCH transmission with a same hybrid automatic repeat request (HARQ) process number as for the transmission of the PUSCH and having a toggled new data indicator (NDI) field value.

5. The method of claim 4, further comprising:

after a number of symbols from a last symbol of the PDCCH, monitoring PDCCH in all CORESETs associated with the CORESETPoolIndex value by using the same antenna port quasi-collocation parameters as the ones associated with the beam.

6. The method of claim 1, wherein the plurality of CORESETPoolIndex values are two CORESETPoolIndex values including CORESETPoolIndex 0 and CORESETPoolIndex 1 and the CORESETPoolIndex value is CORESETPoolIndex 0, and the uplink transmission is a transmission by a physical random access channel (PRACH) which is associated with a beam in the set of candidate beams associated with CORESETPoolIndex 0, wherein power of the beam in the set of candidate beams is larger than or equal to a threshold.

7. The method of claim 6, further comprising:

monitoring a physical downlink control channel (PDCCH) in a recovery search space associated with CORESETPoolIndex 0 by using same antenna port quasi-collocation parameters as the ones associated with the beam.

8. The method of claim 7, further comprising:

after a number of symbols from a last symbol of the PDCCH, monitoring PDCCH in all CORESETs associated with CORESETPoolIndex 0 by using the same antenna port quasi-collocation parameters as the ones associated with the beam; and transmitting a physical uplink control channel (PUCCH) resource associated with CORESETPoolIndex 0 by using the beam and a power determined based on the beam and a closed loop index corresponding to CORESETPoolIndex 0.

9. A user equipment (UE), comprising:

at least one memory; and at least one processor coupled with the at least one memory and configured to cause the UE to:

receive a configuration including a plurality of sets of failure detection beams and a plurality of sets of candidate beams, wherein each set of failure detection beams and each set of candidate beams are associated with one of a plurality of control resource set (CORESET) pool index (CORESETPoolIndex) values;

transmit a beam failure recovery request in an uplink transmission when all beams in a set of failure detection beams in the plurality of sets of failure detection beams associated with a CORESETPoolIndex value of the plurality of CORESETPoolIndex values fail, wherein the uplink transmission is a transmission by a physical uplink shared channel (PUSCH) carrying a medium access control (MAC) control element (CE) to indicate a beam or no beam from the set of candidate beams associated with the CORESETPoolIndex value, wherein power of the beam in the set of candidate beams is larger than or equal to a threshold, wherein the plurality of CORESETPoolIndex values are two CORESETPoolIndex values including CORESETPoolIndex 0 and CORESETPoolIndex 1 and the CORESETPoolIndex value is CORESETPoolIndex 1, and the uplink transmission is a transmission by a physical uplink shared channel (PUSCH) carrying a medium access control (MAC) control element (CE) to indicate a beam or no beam from the set of candidate beams associated with CORESETPoolIndex 1, wherein power of the beam in the set of candidate beams is larger than or equal to a threshold;

receive a downlink control information (DCI) in a physical downlink control channel (PDCCH) to schedule a PUSCH transmission with a same hybrid automatic repeat request (HARQ) process number as for the transmission of the PUSCH and having a toggled new data indicator (NDI) field value; and after a number of symbols from a last symbol of the PDCCH:

monitor PDCCH in all CORESETs associated with CORESETPoolIndex 1 by using the same antenna port quasi-collocation parameters as the ones associated with the beam; and transmit a physical uplink control channel (PUCCH) resource associated with CORESETPoolIndex 1 by using the beam and a power determined based on the beam and a closed loop index corresponding to CORESETPoolIndex 1.

10. The UE of claim 9, wherein a set of failure detection beams associated with the CORESETPoolIndex value includes:

a set of periodic channel state information-reference signal (CSI-RS) resource configuration indexes configured by radio resource control (RRC) signaling;

a set of periodic CSI-RS resource configuration indexes with same values as RS indexes in RS sets indicated by TCI-State for control resource sets (CORESETs) associated with the CORESETPoolIndex value if there is only one RS index in a transmission configuration indicator (TCI) state;

a set of periodic CSI-RS resource configuration indexes with same values as RS indexes with quasi co-location (QCL)-TypeD configuration for the corresponding TCI states if there are two RS indexes in a TCI state of any CORESET associated with the CORESETPoolIndex value;

or any combination thereof.

11. The UE of claim 9, wherein a set of candidate beams associated with the CORESETPoolIndex value includes:

a set of periodic CSI-RS resource configuration indexes;

a set of synchronization signal (SS)/physical broadcast channel (PBCH) block indexes;

or a combination thereof.

12. A base station, comprising:

at least one memory; and at least one processor coupled with the at least one memory and configured to cause the base station to:

transmit a configuration including a plurality of sets of failure detection beams and a plurality of sets of candidate beams, wherein each set of failure detection beams and each set of candidate beams are associated with one of a plurality of control resource set (CORESET) pool index (CORESETPoolIndex) values;

receive a beam failure recovery request in an uplink transmission when all beams in a set of failure detection beams in the plurality of sets of failure detection beams associated with a CORESETPoolIndex value of the plurality of CORESETPoolIndex values fail, wherein the uplink transmission is a transmission by a physical uplink shared channel (PUSCH) carrying a medium access control (MAC) control element (CE) to indicate a beam or no beam from the set of candidate beams associated with the CORESETPoolIndex value, wherein power of the beam in the set of candidate beams is larger than or equal to a threshold, wherein the plurality of CORESETPoolIndex values are two CORESETPoolIndex values including CORESET-PoolIndex 0 and CORESETPoolIndex 1 and the CORESETPoolIndex value is CORESETPoolIndex 1, and the uplink transmission is a transmission by a physical uplink shared channel (PUSCH) carrying a medium access control (MAC) control element (CE) to indicate a beam or no beam from the set of candidate beams associated with CORESETPoolIndex 1, wherein power of the beam in the set of candidate beams is larger than or equal to a threshold;

transmit a downlink control information (DCI) in a physical downlink control channel (PDCCH) to schedule a PUSCH transmission with a same hybrid automatic repeat request (HARQ) process number as for the transmission of the PUSCH and having a toggled new data indicator (NDI) field value; and after a number of symbols from a last symbol of the PDCCH, receive a physical uplink control channel (PUCCH) resource associated with CORESETPooIndex 1 by using the beam and a power determined based on the beam and a closed loop index corresponding to CORESETPoolIndex 1.

13. The base station of claim 12, wherein a set of failure detection beams associated with the CORESETPoolIndex value includes:

a set of periodic channel state information-reference signal (CSI-RS) resource configuration indexes configured by radio resource control (RRC) signaling;

a set of periodic CSI-RS resource configuration indexes with same values as RS indexes in RS sets indicated by TCI-State for control resource sets (CORESETs) associated with the CORESETPoolIndex value if there is only one RS index in a transmission configuration indicator (TCI) state;

a set of periodic CSI-RS resource configuration indexes with same values as RS indexes with quasi co-location (QCL)-TypeD configuration for the corresponding TCI states if there are two RS indexes in a TCI state of any CORESET associated with the CORESETPoolIndex value;

or any combination thereof.

14. The base station of claim 12, wherein a set of candidate beams associated with the CORESETPoolIndex value includes:

a set of periodic CSI-RS resource configuration indexes;

a set of synchronization signal (SS)/physical broadcast channel (PBCH) block indexes;

or a combination thereof.

* * * * *